(12) United States Patent
Chang et al.

(10) Patent No.: US 10,528,106 B2
(45) Date of Patent: Jan. 7, 2020

(54) DISPLAY DEVICE

(71) Applicant: YongLin Biotech Corp., New Taipei (TW)

(72) Inventors: Peng Chang, New Taipei (TW); Jen Fang Cheng, New Taipei (TW)

(73) Assignee: YongLin Biotech Corp., New Taipei (TW)

(*) Notice: Subject to any disclaimer, the term of this patent is extended or adjusted under 35 U.S.C. 154(b) by 0 days.

(21) Appl. No.: 16/107,243

(22) Filed: Aug. 21, 2018

(65) Prior Publication Data

US 2019/0056772 A1 Feb. 21, 2019

(30) Foreign Application Priority Data

Aug. 21, 2017 (CN) .......................... 2017 1 0718096
Dec. 26, 2017 (TW) ............................. 106145818 A

(51) Int. Cl.
G06F 1/26 (2006.01)
G09G 3/20 (2006.01)
G09G 3/34 (2006.01)

(52) U.S. Cl.
CPC ........... *G06F 1/263* (2013.01); *G09G 3/2092* (2013.01); *G09G 3/3453* (2013.01); *G09G 2330/021* (2013.01); *G09G 2380/08* (2013.01)

(58) Field of Classification Search
CPC .......... G09G 3/2092; G09G 2330/021; G09G 2380/08; G09G 2330/04; G09G 3/3453; G06F 1/263
See application file for complete search history.

(56) References Cited

U.S. PATENT DOCUMENTS

| 2011/0012882 A1* | 1/2011 | Jeong | G09G 3/3688 345/211 |
| 2011/0205218 A1* | 8/2011 | Tsuchi | G09G 3/3283 345/212 |
| 2011/0233387 A1* | 9/2011 | Kim | G01J 1/46 250/214.1 |
| 2016/0125791 A1* | 5/2016 | Park | G09G 3/2096 345/211 |

FOREIGN PATENT DOCUMENTS

| TW | 201246145 A1 | 11/2012 |
| TW | M454634 U1 | 6/2013 |

* cited by examiner

*Primary Examiner* — Muhammad N Edun
(74) *Attorney, Agent, or Firm* — ScienBiziP, P.C.

(57) ABSTRACT

A display device for displaying image is disclosed, which comprises: a control module configured to control display of images; and a power source system coupled to the control module and configured to provide system voltage to the control module. The power source system includes: a constant current control module; a first power module coupled to a first node; and a second power module coupled to the first node through the constant current control module. The constant current control module is configured to detect the system voltage provided for the control module, and based on the system voltage, determine whether the second power module charges the first power module with constant current.

15 Claims, 5 Drawing Sheets

DISPLAY DEVICE

CROSS-REFERENCE TO RELATED APPLICATIONS

This application claims priority to China Patent Application No. CN201710718096.9, filed on Aug. 21, 2017, and to Taiwan Patent Application No. 106145818, filed on Dec. 26, 2017 and claim priority to the foregoing China patent application, the contents of which are incorporated by reference herein.

FIELD

The present disclosure pertains to an information display device, and more particularly, to an information display device that can be installed in a ward to display patient information.

BACKGROUND

In the ward of a general hospital, for the convenient display of a patient's basic information (e.g., name, type of illness, hospitalization status, etc) for the patients, family members, or medical staffs, bedside cards with hand written or printed information are commonly placed on the patient's beds.

With the advancement of electronic technology, bedside cards have gradually evolved into electronic display devices on which data can be updated by computers or servers. Such electronic bedside cards require stable power input to operate properly. Also, the design of such electronic information display device are required to minimize interference to the patient as well as reducing work load for the medical staff.

SUMMARY

In view of the above, there is a need to provide a display device that can be placed in a ward to display information display devices for patient information.

Embodiments of the instant disclosure provide a display device for displaying image, which comprises: a control module configured to control display of images; and a power source system coupled to the control module and configured to provide a system voltage to the control module. The power source system includes: a constant current control module; a first power module coupled to a first node; and a second power module coupled to the first node through the constant current control module. The constant current control module is configured to detect the system voltage provided for the control module, and based on the system voltage, determine whether the second power module charges the first power module with constant current.

Embodiments of the instant disclosure also provide a display device for generating a display image. The device comprises: a control module configured to control display of images; a first power module connected to the control module; a second power module connected to the control module; and a constant current control module coupled between the second power module and the control module, and coupled to the first power module at a first node. The constant current control module is configured to detect a system voltage at the first node, and based on the system voltage, determine whether the second power module charges the first power module with constant current.

Accordingly, the display device in accordance with the present disclosure can control the output current of the second power module through the constant current control module, thus alleviates the need for frequent replacement of a battery (when battery is used as a power source module) due to excessive current draw therefrom.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiments of the instant disclosure will be specifically described below with reference to the accompanying drawings.

Figure 1:
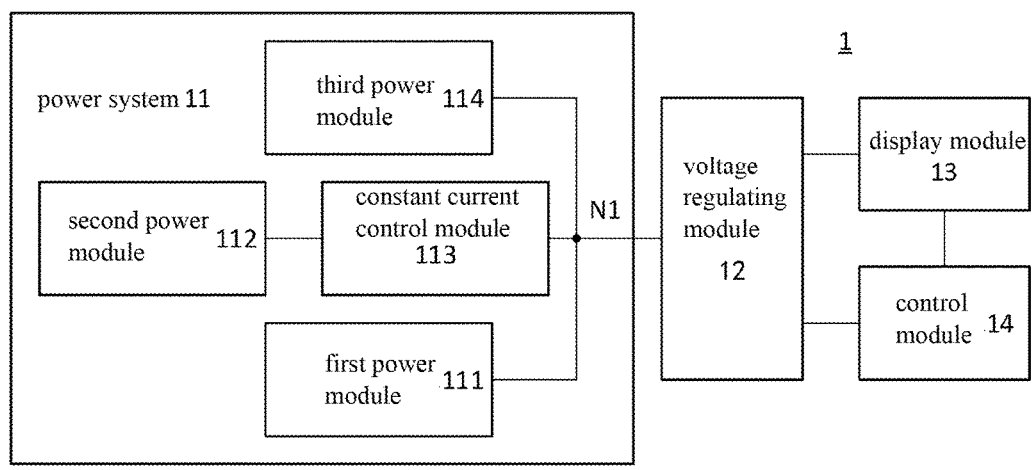
FIG. 1 is a functional block diagram of a first embodiment of a display device in accordance with the present disclosure.

FIG. 1 is a functional block diagram of a first embodiment of a display device in accordance with the present disclosure. The display device 1 includes a power source system 11, a voltage regulating circuit 12, a display module 13, and a control module 14. The power source system 11 includes a first power module 111, a second power module 112, a constant current control module 113, and a third power source module 114.

In one embodiment, the display device 1 can be applied to an electronic bedside card in a ward for displaying patient related information, such as patient name, attending physician, nurse on duty, and patient specific medical history. In one embodiment, the display device 1 is a patient physiological information recording device placed beside a patient's bed, and is utilized to record relevant information that includes the patient's body temperature, blood pressure, pulse, and the like. In one embodiment, the information displayed by the display device 1 may receive input remotely from a caregiver through a server (not shown) or a certified handheld electronic device (not shown), and the control module 14 may control the display of image information on the display module 13.

In one embodiment, the first power module 111 is a rechargeable energy storage device. In one embodiment, the rechargeable energy storage device can be a power module composed of at least one super capacitor (e.g., EDLC) arranged in parallel. The first power module 111 is coupled to a node N1.

In one embodiment, the second power module 112 is a battery module that comprises at least one battery. The battery module is configured to charge the first power module 111 through the constant current control module 113.

In one embodiment, the constant current control module 113 includes a switch-mode power supply integrated circuit (IC). The switch-mode power supply IC is configured to selectively turn on external power output based on a specific received parameter, so as to open or close the external output of a constant current.

In one embodiment, the third power module 114 is a solar module or an external power supply module having a solar charging panel. The third power module 114 is coupled to the first node. N1, and is configured to perform charging for the first power module 111 through the first node N1. In one embodiment, the external power supply module can include a universal serial bus (USB). In one embodiment, the third power module 114 includes both a solar module and an external power supply module.

In one embodiment, the voltage regulating module 12 has a power input terminal coupled to the power source system 11, a first power output terminal coupled to the display module 13, and a second power output terminal coupled to the control module 14.

In one embodiment, the display module 13 includes a low-power display module, such as an electronic paper (epaper) display module having an electronic paper display screen (not shown). After the display module 13 receives a control signal from the control module 14 and an input voltage from the power source system 11, the display module 13 presents a display image associated with the control signal.

In one embodiment, the control module 14 is a control circuit configured to transmit a control signal to the display module 13. The control module 14 may further include a wireless communication module (not shown) configured to establish data connection with a server for obtaining related information. The control module 14 is further configured to convert the received information into control signal.

In one embodiment, the operating voltage range of the display module 13 can be about 2.7V-3.6V, and the operating voltage range of the control module 14 is 2.1V~3.8V Accordingly, the voltage regulating circuit 12 is configured to regulate and maintain a voltage range of 2.7V-3.6V between the first and the second power output terminals, so as to ensure proper operation of the display module 13 and the control module 14. In other words, the voltage regulating circuit 12 is used to ensure that the display module 13 and the control module 14 can receive an input voltage within their respective operational voltage ranges. In addition, the voltage regulating circuit 12 can also serve as a protection circuit for the display module 13 and the control module 14, thus protect the display module 13 and the control module 14 from over voltage damage.

Although the use of epaper display as the display module 13 offers a significant power conserving advantage, wherein the visual information/content may be presented on the display screen even with the absence of power input, the power consumption from the control module 14 nevertheless reduces the operational duration of the display device 1. In one embodiment, the display device 1 may generate power through the third power module 114 and store it in the first power module 111, and through the power consumption calculation and circuit design, the third power module 114 may generate power equal to or greater than the daily power consumption of the display device 1. If the third power module 114 is a solar module having a power storage module, although the power of the power storage module may gradually decrease as the discharge time increases, the incorporation of a solar module provides a mechanism for capturing renewable light energy. Thus, by storing solar/light energy through the solar module, the operational duration of the display device 1 may be effectively extended, thereby reducing the frequency of battery exchange (e.g., the frequency of exchanging the second power module 112).

In one embodiment, in order to extend the operating duration of the information display device, the control circuit 14 is configured to not operate continually, but instead operates periodically. The control module 14 may include a timer configured to wake up the control circuit 14 at regular intervals. After the control circuit 14 is woken up, the control circuit 14 immediately connects to a server or a gateway through a preset/default network connection setting, so as to obtain data corresponding to the display device 1, and updates/refreshes the visual information displayed on the display module 13 (e.g., the electronic paper). When the data displayed on the display module 13 is refreshed, the control circuit 14 promptly enters into sleep mode and awaits the next wake up process.

In one embodiment, in order to reduce the power consumption of the information display device, the design of the voltage regulation module 12 also aims to reduce power consumption. While the voltage regulating module 12 can include various circuit modules such as a boosting circuit, a step-down circuit, a charging circuit, and a protection circuit, it may still be necessary to avoid incorporating excessive/complicated circuit components to cause excessive power consumption. For example, the control module 14 is awakened every 10 minutes, and the display module 13 consumes 50 mW of power per update. If the solar module of the third power module 114 can provide 70 mW every 10 minutes under illumination condition, the power consumption of the internal circuit of the voltage regulation module 12 should be configured to be less than 20 mW every 10 minutes.

In one exemplary scenario, the second power module 112 is electrically connected to the first power module 111 through the first node N1. If the first power module 111 is not fully charged, the second power module 112 or the third power module 114 can charge the first power module 111.

In one embodiment, the power source of the display module 13 and the control module 14 is mainly from the first power module 111, the second power module 112, or the third power module. 114. In one embodiment, the first power module 111 can output a first output voltage, the second power module 112 can output a second output voltage, and the third power module 114 can output a third output voltage. If the third output voltage from the third power module 114 is greater than the first output voltage from the first power module 111, the third power module 13 may be designated to perform charging for the display module 13 and the control module 14. In addition, the third power module 114 may simultaneously charge the first power module 111. Conversely, if the first output voltage of the first power module 111 is greater than the third output voltage of the third power module 114, the first power module 111 may be used to charge the display module 13 and the control module 14. If the first output voltage of the first power module 111 and the third output voltage of the third power module 114 are both lower than a predetermined voltage, the constant current control module 113 may activate the second power module 112 to supply power to the display module 13 and the control module 14. The first power module 111 may also be concurrently charged. If the first output voltage of the first power module 111 or the third output voltage of the third power module 114 becomes higher than the predetermined voltage, the constant current control module 113 may cease the power output from the second power module 112, and change power supply source to the first power module 111 or the third power module 114.

Generally speaking, as long as the third power module 114 charges the first power module 111 for a sufficient period of time, the undesirable situation where the first power module 111 being incapable of providing startup current for the control circuit 14 will not occur. In one embodiment, the display module 13 is configured to be refreshed periodically, and the refresh period is set to be greater than the charging time (of the first power module 111) that corresponds to the power consumption for each refresh operation. In some embodiments, the information display device of the instant embodiment is provided with an external update button configured to instantly refresh the display information upon manual request.

Figure 2:
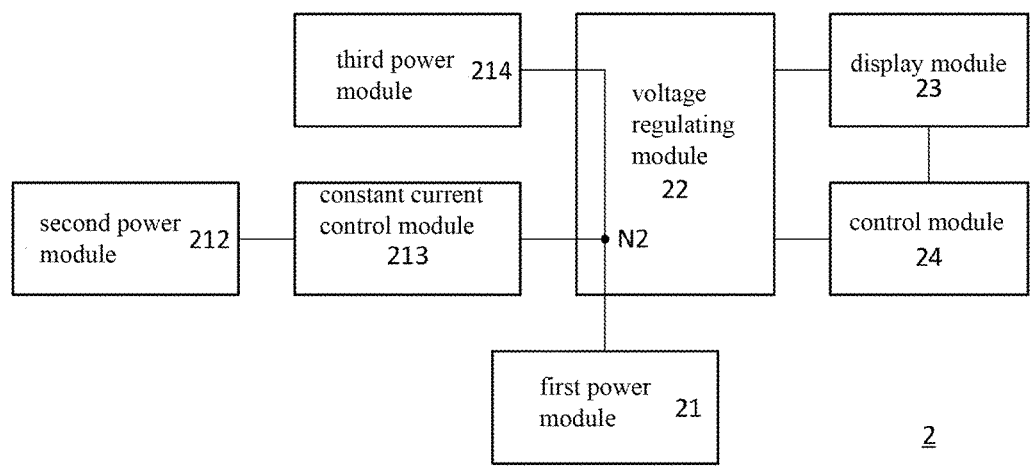
FIG. 2 is a functional block diagram of a second embodiment of a display device in accordance with the present disclosure.

FIG. 2 is a functional block diagram of a second embodiment of a display device in accordance with the present disclosure. The display device 2 includes a first power module 211, a second power module 212, a constant current control module 213, a third power module 214, a voltage regulating circuit 22, a display module 23, and a control module 24.

Figure 3:
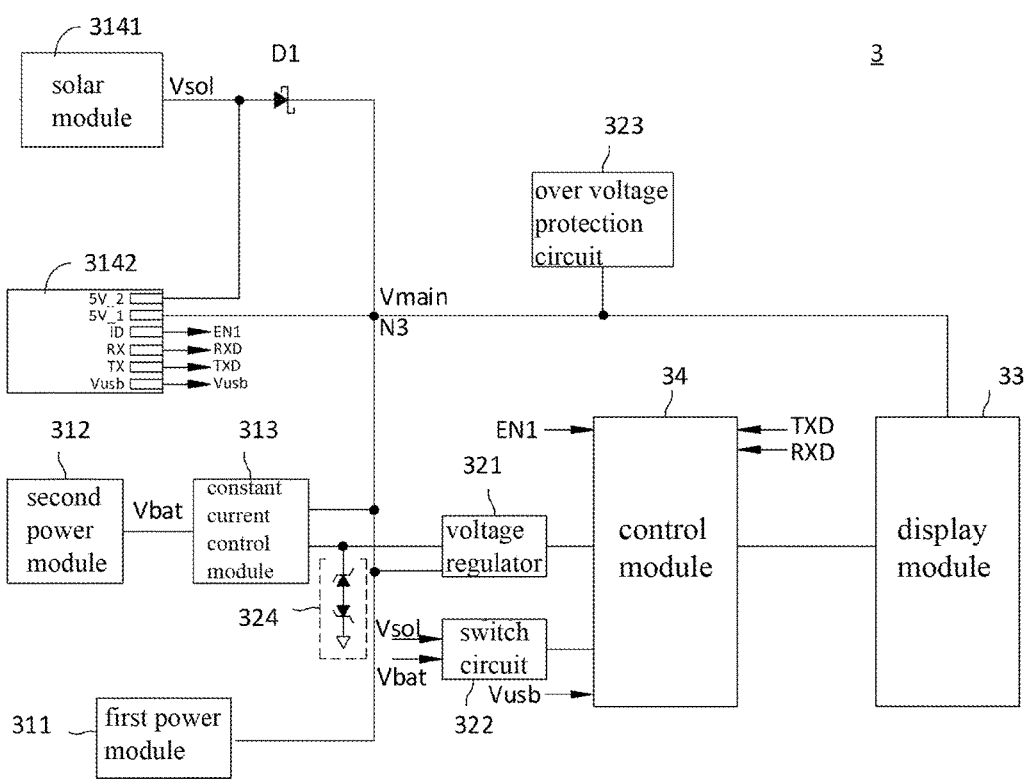
FIG. 3 is a functional block diagram of a third embodiment of a display device in accordance with the present disclosure.

FIG. 3 is a functional block diagram of a third embodiment of a display device in accordance with the present disclosure. FIG. 3 is a functional block diagram of a third embodiment of a display device in accordance with the present disclosure. The display device 3 includes a first power module 311, a second power module 312, a current control module 313, a solar module 3141, an external power module 3142, a voltage regulator 321, a switch circuit. 322, an overvoltage protection circuit 323, an antistatic surge circuit 324, a display module 33, and a control module 34. In one embodiment, the control module 34 can be integrated with a wireless network module. In one embodiment, the voltage regulator 321, the switch circuit 322, the overvoltage protection circuit 323, and the antistatic surge circuit 324 may be components of the voltage regulation module 12 or 22 as described above. In one embodiment, the solar module 3141 includes a solar panel and a super capacitor (not shown) configured to store electrical energy. In addition, as described above, when the display device 3 is in sleep mode, and the first output voltage of the first power module 311 is greater than a fourth output voltage of the solar module 3141, the solar module 3141, the solar panel of the solar module 3141 may still continuously charge the super capacitor. Thus, the solar module 3141 can help to ensure readiness of a large current that may be required to wake up the display device 3.

In one embodiment, when the fourth output voltage Vsol of the solar module 3141 is lower than a system voltage Vmain on the power supply main line, a diode D1 is reverse-biased to block power output from the solar module 3141, so that the solar module 3141 can only charge the internal super capacitor until the fourth output voltage Vsol becomes equal to the system voltage Vmain. If the display module 33 and the control module 34 are in need of power supply of the system voltage Vmain, and if the fourth output voltage Vsol of the solar module 3141 is greater than the output voltage of the other power modules, the system voltage Vmain will be equal to the fourth output voltage Vsol of the solar module 3141. Accordingly, the solar module 3141 performs charging for the display module 33 and the control module 34. In one embodiment, the diode D1 is a Schottky diode.

In one embodiment, the external power module 3142 includes a plurality of pins. In one embodiment, the external power module 3142 is a USB connector module. The external power module 3142 comprises six pins, which are respectively labeled as 5V_1, 5V_2, ID, RX, TX, and Vusb. The 5V_1 pin and the 5V_2 pin are configured to provide a voltage of 5V, and are respectively coupled to the cathode and the anode of the diode D1. Therefore, if the external power module 3142 is properly connected to an external power source (not shown), the solar module 3141 will not output power to the outside. In one embodiment, the 5V_1 pin and the 5V_2 pin can be combined into a single pin.

In one embodiment, when an external power source is connected to the external power module 3142, the pin VUSB transmits a signal VUSB to the control module 34, informing the control module 34 the presence of an external power source. In one embodiment, the external power source is an external device capable of communicating with the control module 34. When the external device needs to communicate with the display device 3, data can be transmitted to or received from/to the controller 406 via the pins RX and TX. In one embodiment, the display device 3 can perform a firmware update via the network. When the control module 34 receives a firmware update indication from a server, the control module 34 may wake up and perform a firmware update at a specified time. It should be noted that the control module 34 does not update the display data/material of the display module 33 during firmware update. In another embodiment, when the control module 34 is woken up for firmware update, it will not request the server for obtaining updated data for the display module 33.

In one embodiment, the display device 3 can be connected to the external device through the external power module 3142 for firmware update. When the external device is to perform firmware update, the pin ID will issue an enabling signal EN1 to the control module 34, informing the control module 34 that a firmware update is to be performed. In another embodiment, voltage of the pin ID will be pulled up to a high voltage level to inform the control module 34 to perform a firmware update. The control module 34 communicates with the external device via the TX and RX pins of the external power module 3142 and performs a firmware update.

In another embodiment, the server connected to the information display device can perform firmware update through remote control. When the information display device is awakened, the information display device first obtains a data from the server (or gateway) through default network connection information (the information includes, e.g., control command and the display data). The operation of updating the electronic paper module 405 can be referred to previous descriptions. When the server needs remote update, the time of the firmware update is added to the control command (for example, at 12:00 AM), so when the display device 3 is woken up at the predetermined time, the control module 34 would not perform data refresh for the display module 33, but only the firmware update process. When the firmware update procedure is performed, the control module 34 downloads a new firmware from the server to a storage module (not shown) of the display device 3, and performs firmware update. In one embodiment, after the firmware is updated, the display device 3 is restarted and the control module 34 reports back to the server that firmware update is completed. Subsequently, the display device 3 enters into sleep mode to wait for next wake up event. In one embodiment, the display device 3 can include a first storage module (not shown) and a second storage module (not shown). The first storage module is configured to store firmware related data, and the second storage module is configured to store display data for the display module 33. In one embodiment, the control command may additionally include location information, wherein the location information may indicate a network location or a web address of another server. When the display device 3 is awakened at a predetermined time, the control module 34 performs a connection according to the location information to obtain new firmware data for performing a firmware update.

In one embodiment, the second power module 312 is coupled to a node N3 through the constant current control module 313. The constant current control module 313 is configured to protect the second power module 312, prevent the second power module 312 from being over-drained, and losing operation life. In the absence of the constant current control module 313, once the system voltage Vmain is lower than the second output voltage Vbat of the second power module 312, the second power module 312 can quickly perform charging for the first power module 311. Therefore, the display device 3 can limit an output current of the second power module 312 through the constant current control module 313. In one embodiment, the constant current control module 313 is turned on only when detecting a system voltage Vmain that is lower than a preset voltage, so as to enable the second power module 312 to output a constant output current for charging the first power module 311 or powering the control module 34 and the display module 33. In one embodiment, when the constant current control module 313 detects a system voltage Vmain lower than the preset voltage, and the control module 34 is not yet awake, the constant current control module 313 is turned on to enable the second power module 312 to charge the first power module 311 with the constant current.

In one embodiment, the preset voltage may include a first preset voltage and a second preset voltage, wherein the first preset voltage is greater than the second preset voltage. In one embodiment, the constant current may be of a first constant current value and a second constant current value, wherein and the first constant current value is less than the second constant current value. In one embodiment, when the constant current control module 313 detects that the system voltage Vmain is between the first preset voltage and the second preset voltage, the constant current control module 313 is turned on to enable the second power module 312 to charge the first power module 311 at the first constant current value. In one embodiment, when the constant current control module 313 detects that the system voltage Vmain is less than the second preset voltage, the constant current control module 313 turns on to enable the second power module 312 to charge the first power module 311 at the second constant current value. In one embodiment, the first preset voltage may be 3.6V, the second preset voltage may be 3.2V; the first constant current value may be 50 (mA), and the second constant current value may be 1 (A).

In one embodiment, the voltage regulator 321 is grounded through an anti-static surge circuit 324 and coupled to the constant current control module 313 and node N3. The antistatic surge circuit 324 is used to prevent surge voltage/current, so as to protect the regulator 321 and the constant current control module 313. The voltage regulator 321 is arranged to receive system voltage Vmain from node N3, and is configured to provide voltage for the control module 34. In one embodiment, the voltage regulator 321 will be turned on to enable the control module 34 at a particular time or when a particular wake-up signal is received. In addition, the overvoltage protection circuit 323 is coupled to node N3 to prevent damage to the display module 33 from excessive voltage therefore (e.g., when system voltage Vmain is too high).

In one embodiment, the control module 34 receives voltage Vmain through the voltage regulator 321, and receives the fourth output voltage $V_{SOL}$ from the solar module 3141 and the second output voltage Vbat from the second power module 312 through the switch circuit 322. The control module 34 can transmit information of the voltage values to the server, so as to allow back-end personnel to monitor the status of the current information display device 3 (or to determine whether the second power module 312 needs to be replaced). In one embodiment, the switch circuit 322 is off by default. Only when the control module 322 receives a request, the switch circuit 322 would be turned on to enable measurements of each output voltages. Upon the measurement and the report of the voltage values, the switch circuit 322 is turned off again.

In one embodiment, the control module 34 is configured to transmit the display data to the display module 33 through a system bus. In one embodiment, the control module 34 sends a request to the display module 33 through a pin EN2 (now shown) for requesting relevant parameter information thereof, such as model, size, resolution, and the like. If the display module 33 does not reply the parameter request for a period of time, the control module 34 will send the request to the display module 33 again, or directly send a reset signal Reset thereto, so as to cause reset of the display module 33. At this time, the screen of the display module 33 will output a factory default screen or a preset screen, and awaits new display data/material from the control module 34.

In one embodiment, the system voltage Vmain is set in accordance with the actual voltage conditions of each power modules, so as to determine which voltage output from the respective power modules will be set as the system voltage Vmain. In one embodiment, the fifth output voltage of the external power module 3142 is greater than a maximum output-able voltage of the first power module 311 and the preset voltage of the second power module 312 (which is regulated by the constant current control module 313). Thus, when the external power module 3142 is connected to the node N3, the solar module 3141 will not output power due to the diode D1, and because the constant current control module 313 determines that the fifth output voltage of the external power supply module 3142 is greater than the preset voltage, the second power module 312 is controlled to cease power output externally. Meanwhile, the first output voltage of the first power module 311 is smaller than the fifth output voltage of the external power module 3142. Thus, the external power module 3142 performs charging for the first power module 311. As shown above, when the external power module 3142 is connected to the node N3, the fifth output voltage from the external power module 3142 is set to be the system voltage.

In one embodiment, when the external power supply is not connected to the external power module 3142, if the fourth output voltage Vsol of the solar module 3141 is greater than the preset voltage and the first output voltage of the first power module 311, the second power module 312 will cease power output due to the determination by the constant current control module 313 that the fourth output voltage Vsol of the solar module 3141 is greater than the preset voltage. Therefore, the fourth output voltage Vsol of the solar module 3141 is set to be the system voltage Vmain, and the solar module 3141 performs charging for the first power module 311 at the same time. If the first output voltage of the first power module 311 is greater than the preset voltage and the fourth output voltage Vsol of the solar module 3141, the second power module 312 will cases power output due to the determination of the constant current control module 313 that the first output voltage of the first power module 311 being greater than the preset voltage; in addition, the solar module 3141 will cease power output due to the diode D1. Accordingly, the first output voltage of the first power module 311 is set to be the system voltage Vmain. If the preset voltage is greater than the first output voltage of the first power module 311 and the fourth output voltage Vsol of the solar module 3141, the second power module 312 transmits electric current with the constant value to the node N3 through the constant current control module 313. At this time, the solar module 3141 will not output power due to reverse-bias of the diode D1, and the second power module 312 will provide electric current with the constant value via the constant current control module 313 to charge the first power module 311. In summary, the external power module 3142 may be of priority order when setting the power module for supplying system voltage Vmain. Otherwise, the selection may be based on the output voltage of the solar module 3141 and the first power module 311, as well as the preset voltage level of the second power module 312, for determining the voltage value of the system voltage Vmain.

Figure 4:
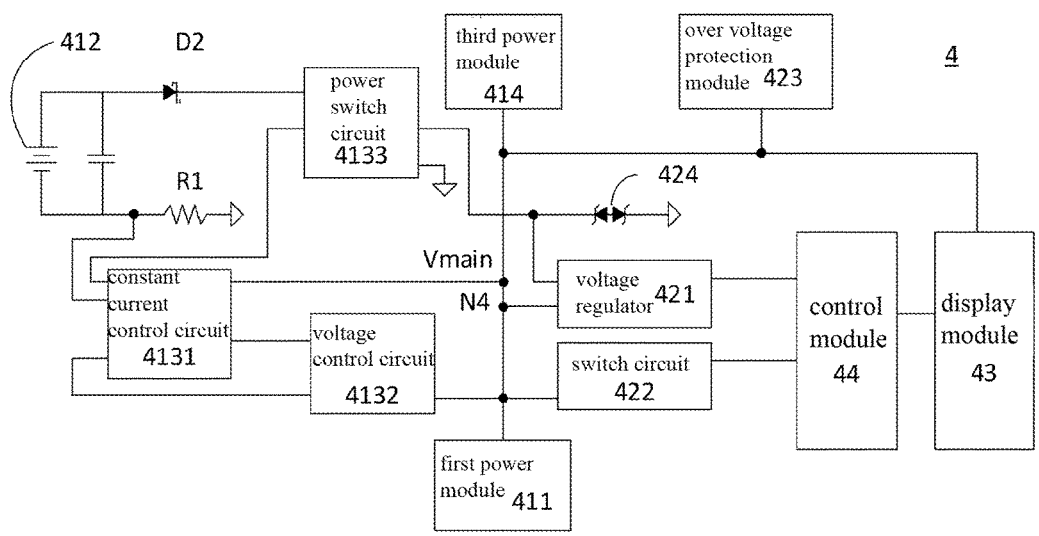
FIG. 4 is a functional block diagram of a fourth embodiment of a display device in accordance with the present disclosure.

FIG. 4 is a functional block diagram of a fourth embodiment of a display device in accordance with the present disclosure. The display device 4 includes a first power module 411, a second power module 412, a constant current control circuit 4131, a constant voltage control circuit 4132, a power switching circuit 4133, a third power module 414, a voltage regulator 421, a switch circuit 422, an overvoltage protection circuit 423, an antistatic surge circuit 424, a display module 43, and a control module 44. In one embodiment, the control module 44 can be integrated with a wireless network module. In one embodiment, the constant current control circuit 4131, the constant voltage control circuit 4132, and the power switching circuit 4133 may be the components of the aforementioned constant current control module 113, 213, or 313. In one embodiment, the voltage regulator 421, the switch circuit 422, the overvoltage protection circuit 423, and the anti-static surge circuit 424 can be the components of the voltage regulation module 12 or 22 described above. In one embodiment, the third power module 414 can be a solar module, an external power module, or a parallel combination of both solar module and external power module.

In one embodiment, the second power module 412 is coupled to a node N4 through the constant current control module 4131. The constant current control module 4131 is configured to protect the second power module 412 and prevent the second power module 412 from being over-drained and losing operation life. In the absence of the constant current control module 413, once the system voltage Vmain is lower than the second output voltage Vbat of the second power module 412, the second power module 412 can quickly perform charging for the first power module 411. Therefore, the display device 4 can limit an output current of the second power module 412 through the constant current control module 4131. In one embodiment, the constant current control module 4131 is turned on only when detecting a system voltage Vmain that is lower than a preset voltage, so as to enable the second power module 412 to output a constant output current for charging the first power module 411 or powering the control module 44 and the display module 43. In one embodiment, when the constant current control module 4131 detects a system voltage Vmain lower than the preset voltage, and the control module 44 is not yet awake, the constant current control module 4131 is turned on to enable the second power module 412 to charge the first power module 411 with the constant current.

In one embodiment, the preset voltage may include a first preset voltage and a second preset voltage, wherein the first preset voltage is greater than the second preset voltage. In one embodiment, the constant current may be of a first constant current value and a second constant current value, wherein and the first constant current value is less than the second constant current value. In one embodiment, when the constant current control module 4131 detects that the system voltage Vmain is between the first preset voltage and the second preset voltage, the constant current control module 413 is turned on to enable the second power module 412 to charge the first power module 411 at the first constant current value. In one embodiment, when the constant current control module 4131 detects that the system voltage Vmain is less than the second preset voltage, the constant current control module 413 turns on to enable the second power module 412 to charge the first power module 411 at the second constant current value. In one embodiment, the first preset voltage may be 3.6V, the second preset voltage may be 3.2V; the first constant current value may be 50 (mA), and the second constant current value may be 1 (A).

In one embodiment, the constant current control circuit 4131 is configured to control whether the second power module 412 provides a current at a first constant current value and a second constant current value. Accordingly, the constant current control circuit 4131 may possess no voltage control capability, so the voltage control circuit 4132 may be coupled to the constant current control circuit 4131, and the voltage control circuit 4132 may be coupled to the node N4. Therefore, the voltage control circuit 4132 can receive the system voltage Vmain, and based on the system voltage Vmain, control the second output voltage from the second power module 412 via the constant current control circuit 4131. In one embodiment, when the voltage control circuit 4132 confirms that the system voltage Vmain is between the first preset voltage and the second preset voltage, and the control module 44 is not awake, the constant current control circuit 4131 will enable the second power module 412 to charge the first power module 411 at the first constant current value. Meanwhile, the voltage control circuit 4132 continuously confirms the system voltage Vmain governed by the second power module 412, and thereby controls the second output voltage of the second power module 412. In one embodiment, when the voltage control circuit 4132 confirms that the system voltage Vmain is lower than the second preset voltage, the constant current control circuit 4131 causes the second power module 412 to charge the first power module 411 at the second constant current value.

The second power module 412 is coupled to node N4 through the constant current control circuit 4131. The constant current control circuit 4131 can be used to protect the second power module 412 to prevent the second power module 412 from being over-drained and losing operational life. In the absence of the constant current control module 4131, once the system voltage Vmain is lower than the second output voltage Vbat of the second power module 412, the second power module 412 can quickly perform charging for the first power module 411.

In one embodiment, the voltage regulator 421 is grounded through an anti-static surge circuit 424 and coupled to the constant current control circuit 4131 and node N4. The antistatic surge circuit 424 is used to prevent surge voltage/current, so as to protect the regulator 421 and the constant current control module 413. The voltage regulator 421 is arranged to receive system voltage Vmain from node N4, and is configured to provide voltage for the control module 44. In one embodiment, the voltage regulator 421 will be turned on to enable the control module 44 at a particular time or when a particular wake-up signal is received. In addition, the overvoltage protection circuit 423 is coupled to node N4 to prevent damage to the display module 43 from excessive voltage (e.g., when system voltage Vmain is too high) therefore.

In one embodiment, the control module 44 receives voltage Vmain through the voltage regulator 421, and receives the third output voltage from the third power module 414 and the second output voltage Vbat from the second power module 412 through the switch circuit 422. The control module 44 can transmit information of the voltage values to the server, so as to allow back-end personnel to monitor the status of the current information display device 4 (or to determine whether the second power module 412 needs to be replaced). In one embodiment, the switch circuit 422 is off by default. Only when the control module 422 receives a request, the switch circuit 422 would be turned on to enable measurements of each output voltages. Upon the measurement and the report of the voltage values, the switch circuit 422 will be turned off again.

In one embodiment, the system voltage Vmain is set in accordance with the actual voltage conditions of each power modules, so as to determine which voltage output from the respective power modules will be set as the system voltage Vmain. In one embodiment, if the third output voltage of the third power module 414 is greater than the preset voltage and the first output voltage of the first power module 411, the second power module 412 will cease power output due to the determination by the constant current control circuit 4131 that the third output voltage of the third power module 414 is greater than the preset voltage. Therefore, the third output voltage from the third power module 414 is set to be the system voltage Vmain, and the third power module 414 will perform charging for the first power module 411 at the same time. If the first output voltage of the first power module 411 is greater than the preset voltage and the third output voltage of the third power module 414, the second power module 412 will cases power output due to the determination of the constant current control circuit 4131 that the first output voltage of the first power module 411 being greater than the preset voltage; in addition, the third power module 414 also will cease external power output. Accordingly, the first output voltage of the first power module 411 is set to be the system voltage Vmain. If the preset voltage is greater than the first output voltage of the first power module 411 and the third output voltage of the third power module 414, the second power module 412 will transmit electric current with the constant value to the node N4 through the constant current control circuit 4131. Meanwhile, the third power module 3141 will not output power externally, and the second power module 412 will provide electric current with the constant value via the constant current control circuit 4131 to charge the first power module 411.

Figure 5:
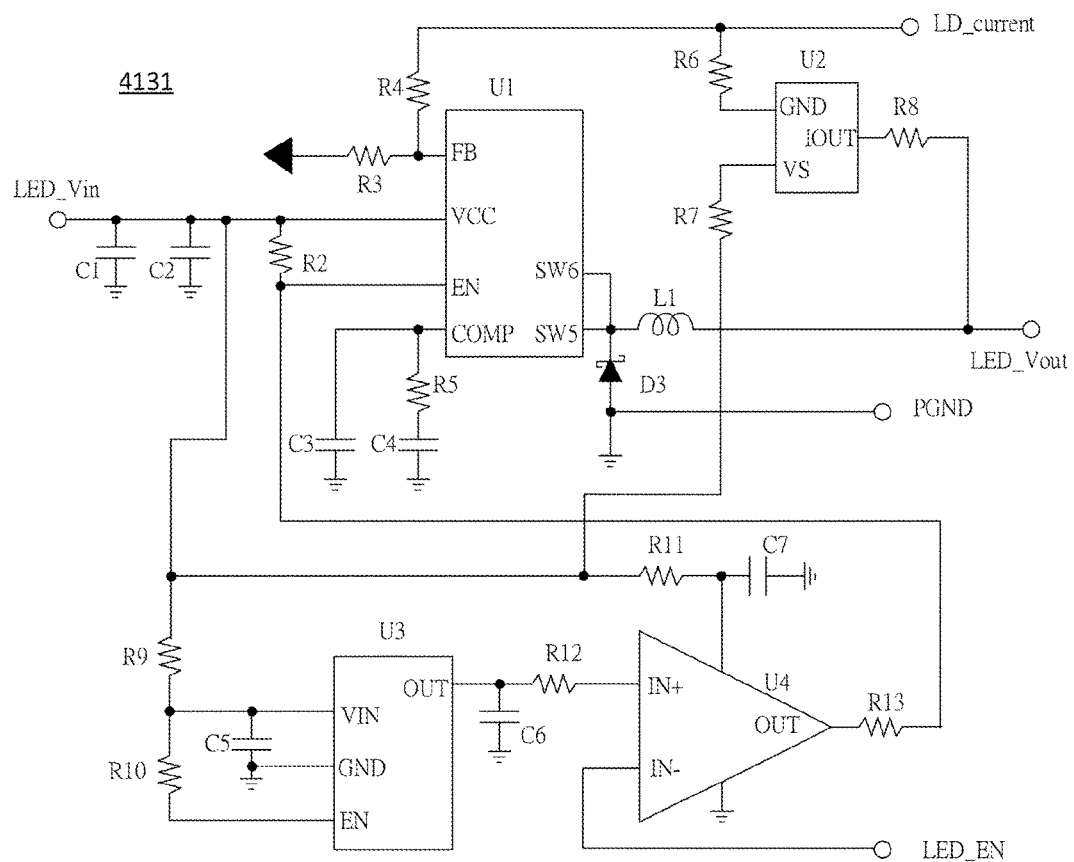
FIG. 5 is a circuit diagram of an exemplary constant current control circuit in a display device in accordance with the present disclosure.

FIG. 5 is a circuit diagram of an exemplary constant current control circuit 4131 in the exemplary display device 4 in accordance with some embodiments of the present disclosure. The constant current control circuit 4131 includes a first processing circuit U1, a second processing circuit U2, a third processing circuit U3, a fourth processing circuit U4, a plurality of resistors R2-R13, a plurality of capacitors C1-C7, an inductor L1, a diode D3, and five terminals thereof: LED_Vin, LED_Vout, LED_EN, LD_current, and PGND. The use and connection of the capacitors, inductors, resistors, diodes and processing circuits in the figure are only schematic illustrations. The exact connection arrangement of the constant current control circuit 4131 and the placement of electronic components should not be limited to that shown in instant figure.

In one embodiment, the first processing circuit U1 can be a switching power supply IC, the second processing circuit U2 can be a driving IC, and the third processing circuit U3 can be a voltage regulator. The fourth processing circuit U4 can be a comparator. In one embodiment, when the first processing circuit U1 is the switching power supply IC, the first processing circuit U1 can be a switch-type light-emitting diode (LED) driver IC. When the second processing circuit U2 is the driving IC, the second processing circuit U2 can be a linear LED driver IC.

In one embodiment, the first processing circuit U1 has a plurality of pins FB, VCC, EN, COMP, SW5, and SW6. The second processing circuit U2 has a plurality of pins GND, VS and IOUT. The third processing circuit U3 has a plurality of pins YIN, GND, EN and OUT. The fourth processing circuit U4 has a plurality of pins IN+, IN−, and OUT.

In one embodiment, the constant current control circuit 4131 is coupled to the voltage control circuit 4132 through the terminals LED_EN and LD_current. In one embodiment, the constant current control circuit 4131 is coupled to the node N4 through the terminal LED_Vout. In one embodiment, the constant current control circuit 4131 is coupled to the second power module 412 through the terminal PGND. In one embodiment, the terminal LED_Vin of the constant current control circuit 4131 is coupled to the second power module 412 through the power switching circuit 4133. In one embodiment, the second power module 412 is a battery module having a positive terminal and a negative terminal. The constant current control circuit 4131 is coupled to the negative terminal of the second power module 412 through the terminal PGND. The terminal LED_Vin of the constant current control circuit 4131 is coupled to the positive terminal of the second power module 412 via the power switching circuit 4133.

Please refer concurrently to FIG. 4 and FIG. 5. When the power switching circuit 4133 switches an internal power switch (not shown) to cause the second power module 412 to provide the second output voltage of the second power module 412 to the terminal LED_Vin via the power switching circuit 4133, the pin Vin of the third processing circuit U3 receives the send output voltage of the second power module 412 via the terminal LED_Vin, and accordingly outputs a first comparison voltage through the pin OUT of the third processing circuit U3. The pin IN+ of the fourth processing circuit U4 receives the first comparison voltage from the third processing circuit U3, and the pin IN− of the fourth processing circuit U4 receives a second comparison voltage provided from voltage control circuit 4132. In one embodiment, after receiving the system voltage of node N4, the voltage control circuit 4132 outputs the second comparison voltage to the pin IN− of the fourth processing circuit U4. The fourth processing circuit U4 compares the first comparison voltage with the second comparison voltage. If the first comparison voltage is greater than the second comparison voltage, it indicates that the system voltage is low, and thus requires the provision of additional power output (e.g., through the second output voltage from the second power module 412) via the constant current control circuit 4131 to node N4. Accordingly, the fourth processing circuit U4 will provide an enable voltage to the pin EN of the first processing circuit U1.

In one embodiment, after the pin EN of the first processing circuit U1 receives the enable voltage from the fourth processing circuit U4, the first processing circuit U1 receives the second output voltage from the second power module 412 via pin VCC and the terminal LED_Vin. Accordingly, the first processing circuit U1 outputs the constant current though the pin SW6 and the terminal LED_Vout, thereby charging the first power module 411 at a constant current value.

In one embodiment, the voltage value of the first comparison voltage may be set according to the preset voltage, in order to ensure that when the system voltage Vmain is greater than the preset voltage, the second comparison voltage received by the fourth processing circuit U4 (via the LED_EN terminal) can be greater than the first comparison voltage, so as to prevent the EN pin of the first processing circuit U1 from receiving the enable signal, and the second power module 412 is unable to output constant current through the constant current control circuit 4131.

In one embodiment, when the preset voltage includes a first preset voltage and a second preset voltage, the voltage value of the first comparison voltage may be set in accordance with the second preset voltage, so as to ensure that when the system voltage Vmain is less than the second preset voltage, the second comparison voltage received by the fourth processing circuit U4 (via the terminal LED_EN) can be less than the first comparison voltage. Thus, the first processing circuit U1 can receive the enable signal (via the EN pin). Accordingly, the second power module 412 may output the second constant current through the first processing circuit U1. If the value of the system voltage Vmain is between the first preset voltage and the second preset voltage, the system voltage Vmain is greater than the second preset voltage, which causes the second comparison voltage (received by the fourth processing circuit U4 via the LED_EN terminal) to be greater than the first comparison voltage, such that the second power module 412 would be unable to output the second constant current through the first processing circuit U1. At this time, the second processing circuit U2 receives (via pin VS) the second output voltage of the second power module 412 from the LED_Vin terminal, and outputs the first constant current from the LED_Vout terminal via the IOUT pin of the second processing circuit U2. If the system voltage Vmain is greater than the first preset voltage, the second power module 412 will be unable to output the second constant current through the first processing circuit U1, and the second processing circuit U2 will also be unable to output the first constant current due to the voltage control circuit 4132 switching off the voltage provision to the LD_current terminal, and thus the constant current control circuit 4131 stops outputting the constant current.

In one embodiment, when the system voltage Vmain is less than the second preset voltage, the first processing circuit U1 may output the second constant current, and the second processing circuit U2 may output the first constant current. In one embodiment, because the value of the second constant current can be significantly smaller than that of the second constant current (output by the first processing circuit U1), the sum of the first and the second constant currents can be regarded as being substantially equal to the second constant current (output by the first processing circuit U1), which represents the constant current output of the constant current control circuit 4131.

In one embodiment, the voltage control circuit 4132 has a voltage switch (not shown) that turns on the voltage control circuit 4132 when the system voltage is less than the first preset voltage. The voltage switch circuit 4132 thus transmits voltage to the GND pin of the second processing circuit U2 through the LD_Current terminal of the constant current control circuit 4131. Therefore, the second processing circuit U2 can output the first constant current to the LED_Vout terminal via the IOUT pin of the second processing circuit U2. When the system voltage is greater than the first preset voltage, the voltage control circuit 4132 turns off the voltage switch, so that the voltage control circuit 4132 cannot provide voltage to the GND pin of the second processing circuit U2. Therefore, the second processing circuit U2 will be unable to output the first constant current to the LED_Vout terminal.

It should be noted that, the circuit components or the operation modes of the exemplary ringer control device described in the foregoing embodiments may be interchanged or combined, given no substantial conflicts in compatibility. Thus, the scope of disclosure should not be limited to the specific embodiments described herein.

The embodiments shown and described above are only examples. Many details are often found in this field of art thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A display device for displaying image, comprising:
a control module configured to control display of images; and
a power source system coupled to the control module and configured to provide system voltage to the control module, including
a constant current control module;
a first power module coupled to a first node; and
a second power module coupled to the first node through the constant current control module,
wherein the constant current control module is configured to detect system voltage provided for the control module, and based on system voltage, determine whether the second power module charges the first power module with constant current.

2. The device of claim 1, wherein
when system voltage is higher than or equal to a first preset voltage, the constant current control module stops the second power module from charging the first power module; and
when system voltage is lower than the first preset voltage, the constant current control module causes the second power module to charge the first power module with constant current.

3. The device of claim 2, wherein
when system voltage is between the first preset voltage and a second preset voltage, the constant current control module sets a first preset current value, and causes the second power module to charge the first power module at the first preset current value; and when system voltage is below the second preset voltage, the constant current control module sets a second preset current, and causes the second power module to charge the first power module at the second preset current value.

4. The device of claim 3, wherein the first preset voltage is greater than the second preset voltage; and the first preset current value is smaller than the second preset current value.

5. The device of claim 2, wherein the power source system further comprises:
a third power source module coupled to the first node, configured to output a third output voltage, wherein when the third output voltage is greater than a first output voltage of the first power module, the third power source module charges the first power module.

6. The device of claim 5, wherein
when the third output voltage is greater than the first output voltage and the first preset voltage, the third output voltage is set as system voltage and provided to the control module, and the third power source module charges the first power module with the third output voltage; and
when the first output voltage is greater than the third output voltage and the first preset voltage, the first output voltage is set as system voltage and provided to the control module.

7. The device of claim 1, further comprising:
a display module coupled to the control module and the power source system, configured to
receive system voltage from the power source system, and
receive a control signal from the control module for generating display image.

8. The device of claim 1, wherein the constant current control module includes a light-emitting diode driver (LED driver).

9. A display device for generating a display image, comprising:
a control module configured to control display of images;
a first power module connected to the control module;
a second power module connected to the control module; and
a constant current control module coupled between the second power module and the control module, and coupled to the first power module at a first node,
wherein the constant current control module is configured to detect system voltage at the first node, and based on system voltage, determine whether the second power module charges the first power module with constant current.

10. The device of claim 9, wherein
when system voltage is higher than or equal to a first preset voltage, the constant current control module stops the second power module from charging the first power module; and
when system voltage is lower than the first preset voltage, the constant current control module causes the second power module to charge the first power module with constant current.

11. The device of claim 10, wherein
when system voltage is between the first preset voltage and a second preset voltage, the constant current control module sets a first preset current value, and causes the second power module to charge the first power module at the first preset current value; and
when system voltage is below the second preset voltage, the constant current control module sets a second preset current, and causes the second power module to charge the first power module at the second preset current value.

12. The device of claim 10, wherein the power source system further comprises:
a third power source module coupled to the first node, configured to output a third output voltage, wherein when the third output voltage is greater than a first output voltage of the first power module, the third power source module charges the first power module.

13. The device of claim 12, wherein
when the third output voltage is greater than the first output voltage and the first preset voltage, the third output voltage is set as system voltage and provided to the control module, and the third power source module charges the first power module with the third output voltage; and
when the first output voltage is greater than the third output voltage and the first preset voltage, the first output voltage is set as system voltage and provided to the control module.

14. The device of claim 9, further comprising:
a display module coupled to the control module and the first node, configured to:
receive system voltage from the first node, and
receive a control signal from the control module for generating display image.

15. The device of claim 9, wherein the constant current control module includes a light-emitting diode driver (LED driver).

* * * * *